Sept. 9, 1969     G. EMERICK     3,465,526
GAS TURBINE POWER PLANTS

Filed Nov. 30, 1967     7 Sheets-Sheet 3

George Emerick
INVENTOR
BY Maw Linney + Maw Linney
ATTORNEY

United States Patent Office 3,465,526
Patented Sept. 9, 1969

---

3,465,526
GAS TURBINE POWER PLANTS
George Emerick, London, England, assignor, by mesne
assignments, to Rolls-Royce Limited, Derby, England,
a British company
Filed Nov. 30, 1967, Ser. No. 686,969
Claims priority, application Great Britain, Nov. 30, 1966,
53,715/66
Int. Cl. F02k *3/00;* F02c *7/02, 3/10*
U.S. Cl. 60—269                    7 Claims

ABSTRACT OF THE DISCLOSURE

A gas turbine power plant comprising an air compressor arranged to deliver air to combustion apparatus the hot gases from which after passing through a first nozzle ring and acting on a first turbine rotor arranged to drive the compressor, then pass in succession through a second nozzle ring and act on a second turbine rotor constituting a power turbine rotor and then through a third nozzle ring and act on a third turbine rotor also constituting a power turbine rotor, the second and third turbine rotors constitute independent sources of mechanical power and the second and third nozzle rings are adjustable and have associated with them adjusting mechanism arranged to control them simultaneously in a predetermined relationship and thereby vary the relationship between the mechanical power available respectively from the said second and third turbine rotors.

---

Figure 1:
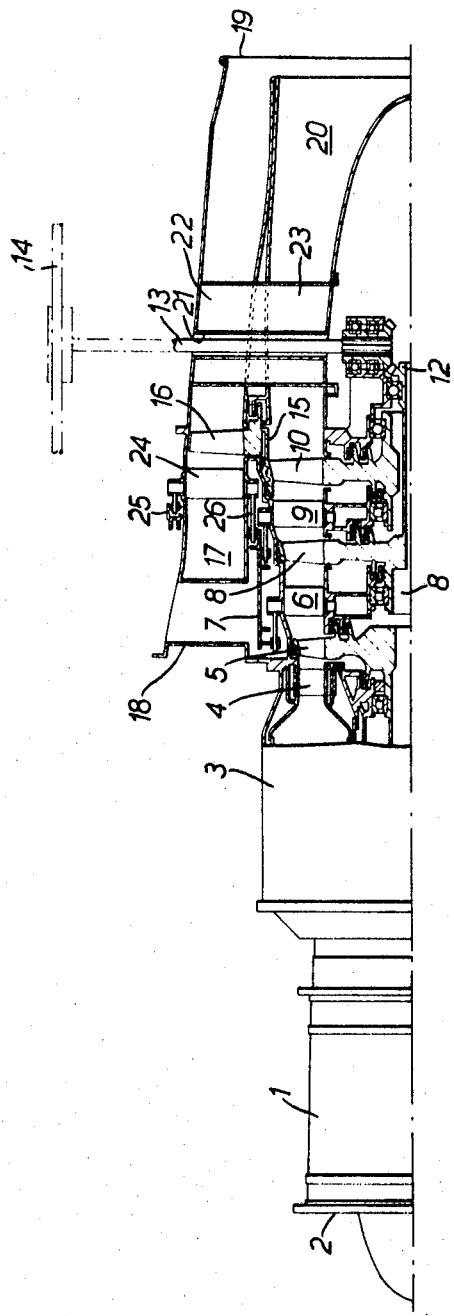

This invention relates to gas turbine power plants of the kind comprising an air compressor arranged to deliver air to combustion apparatus the products of combustion (hereinafter called for convenience the hot gases) from which act on a first turbine rotor arranged to drive the air compressor and then on at least two further turbine rotors (hereinafter for convenience called power turbine rotors), constituting sources of power for power driven devices, and has for an object to provide a gas turbine power plant of the above kind which will be particularly suitable for use where it is necessary or desirable to provide for substantial variations in the power demand of at least one power driven device, as for example where the power plant is employed in aircraft to drive one or more helicopter rotors or lift fans the power demands of which may vary widely, or for example, where the power plant is used to drive an electric generator the speed of which has to be maintained constant to maintain constant frequency alternating electrical output while its power absorbtion will vary in accordance with the variable electrical demand placed upon it.

In a gas turbine power plant of the kind referred to according to the present invention the hot gases from the combustion apparatus after passing through a first nozzle ring and acting on a first turbine rotor arranged to drive the compressor, then pass in succession through a second nozzle ring and act on a second turbine rotor constituting a power turbine rotor and then through a third nozzle ring and act on a third turbine rotor, also constituting a power turbine rotor, the second and third turbine rotors constitute independent sources of mechanical power and the second and third nozzle rings are adjustable and have associated with them adjusting mechanism arranged to control them simultaneously in a predetermined relationship, and thereby vary the relationship between the mechanical power available respectively from the said second and third turbine rotors.

Thus, in addition to any automatic or other control apparatus which may be provided to control the fuel supply to the combustion apparatus and hence the mass flow of hot gases available for conversion into mechanical power by the second and third turbine rotors, the second and third nozzle rings can be adjusted simultaneously to suit variations in the relationship between the power demands placed on the second and third turbine rotors.

In one particular application of the invention to a gas turbine power plant for an aircraft, one of the two power turbine rotors (preferably the second turbine rotor) may be arranged to drive at least one helicopter rotor while the other of these two power turbine rotors drives a fan providing propulsion air for jet propulsion purposes. In this case according to a further feature of the invention the fan may be provided with adjustable inlet guide vanes and the adjusting mechanism for said guide vanes is arranged to be operated simultaneously with the adjusting mechanism for the adjustable nozzle rings associated with the second and third turbine rotors. Thus in such an arrangement the power absorbtion of the fan from its associated power turbine rotor may be a function jointly of the settings of the adjustable nozzle ring and the setting of the adjustable inlet guide vanes and the relationship between the simultaneous variations in these settings effected by the adjusting mechanism may be such as to provide for substantially maximum efficiency over the range of operating conditions.

The term adjustable nozzle ring is used herein in its usual sense to mean a structure, usually consisting of an annular series of spaced blades, which serves to direct the hot gases onto the blades of the associated turbine rotor and is adjustable to vary the flow characteristics of the gases directed onto such blades so as to vary the operating conditions of the turbine rotor.

In a further particular form of gas tnurbine power plant according to the invention applicable to an aircraft one of the power turbine rotors (preferably the second turbine rotor) may be arranged to drive a propulsion air fan delivering propulsion air to one or more propulsion nozzles while the other power turbine rotor is arranged to drive a lift fan and in this case the propulsion air fan may have adjustable inlet guide vanes associated therewith and the adjusting mechanism for such guide vanes may be arranged to be actuated simultaneously with the adjusting mechanism for the adjustable nozzle rings associated with the second and third turbine rotors. In this case also therefore the simultaneous adjustment of the adjustable inlet guide vanes and the adjustable nozzle rings may be such as to provide approximately maximum efficiency over the range of operating conditions.

Figure 2:
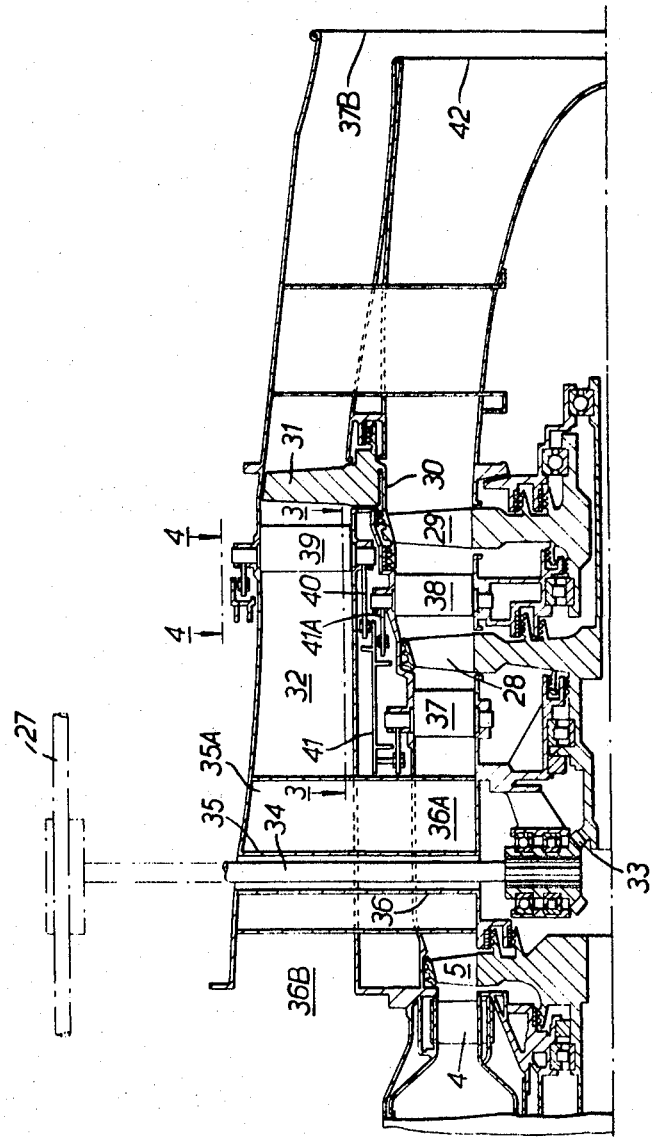
Figure 3:
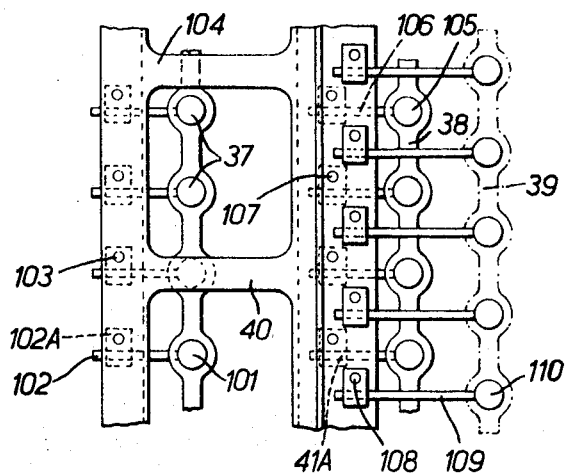
Figure 4:
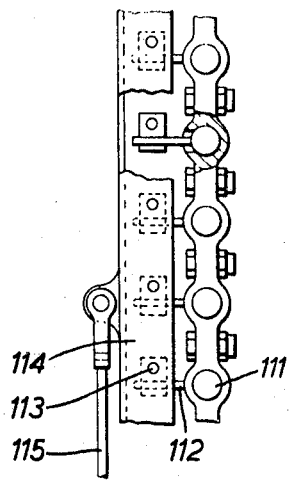
Figure 5:
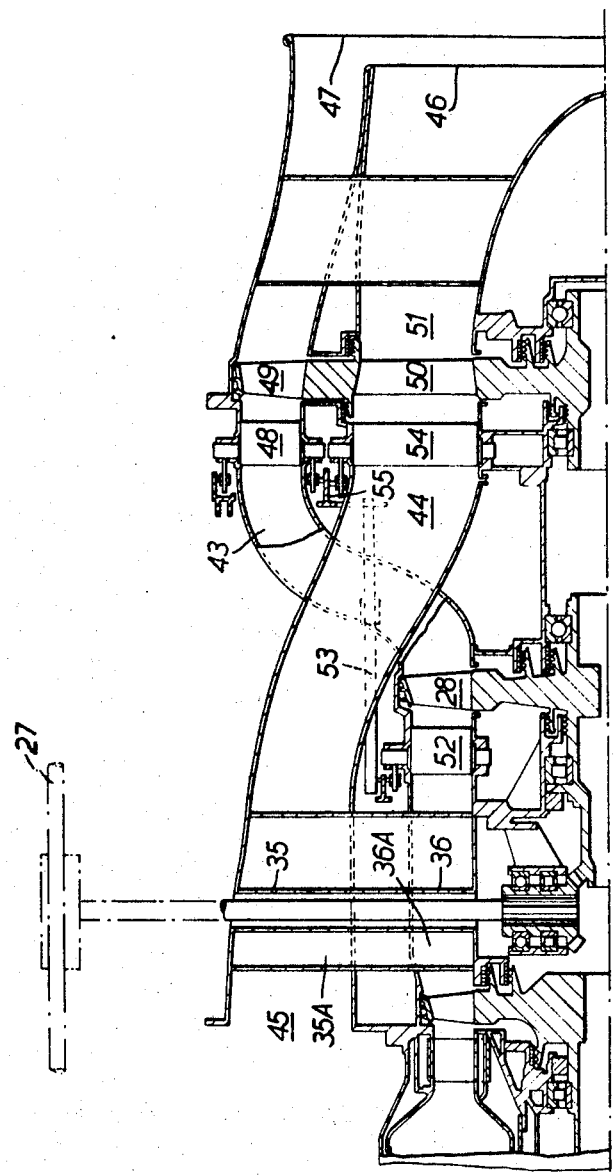
Figure 6:
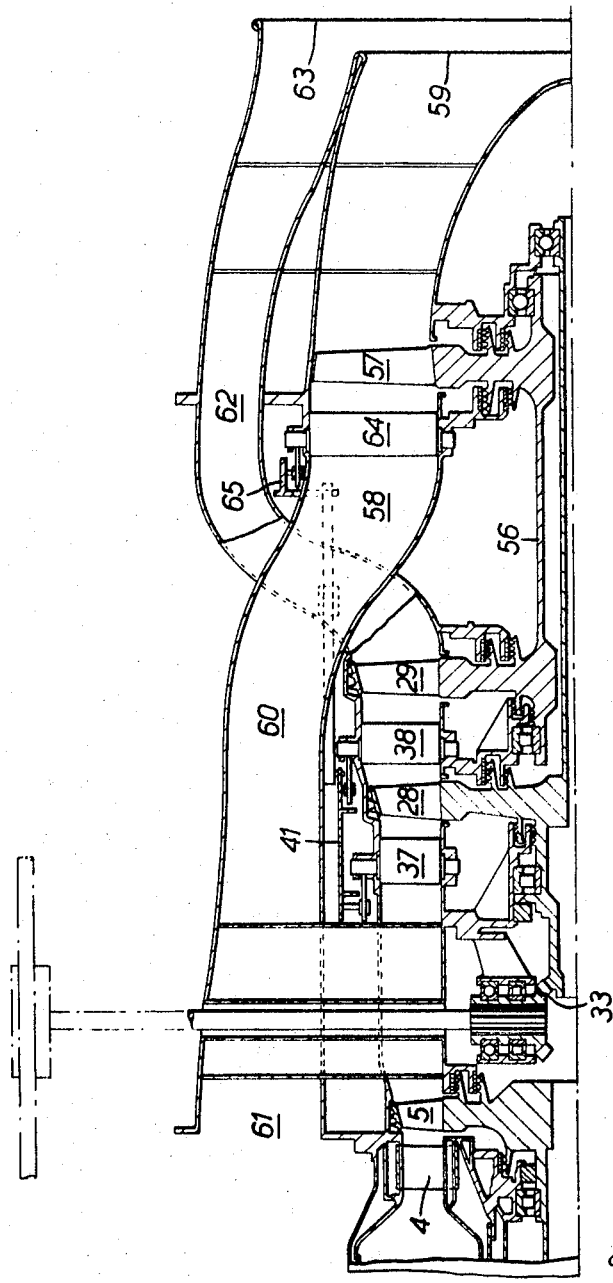
Figure 7:
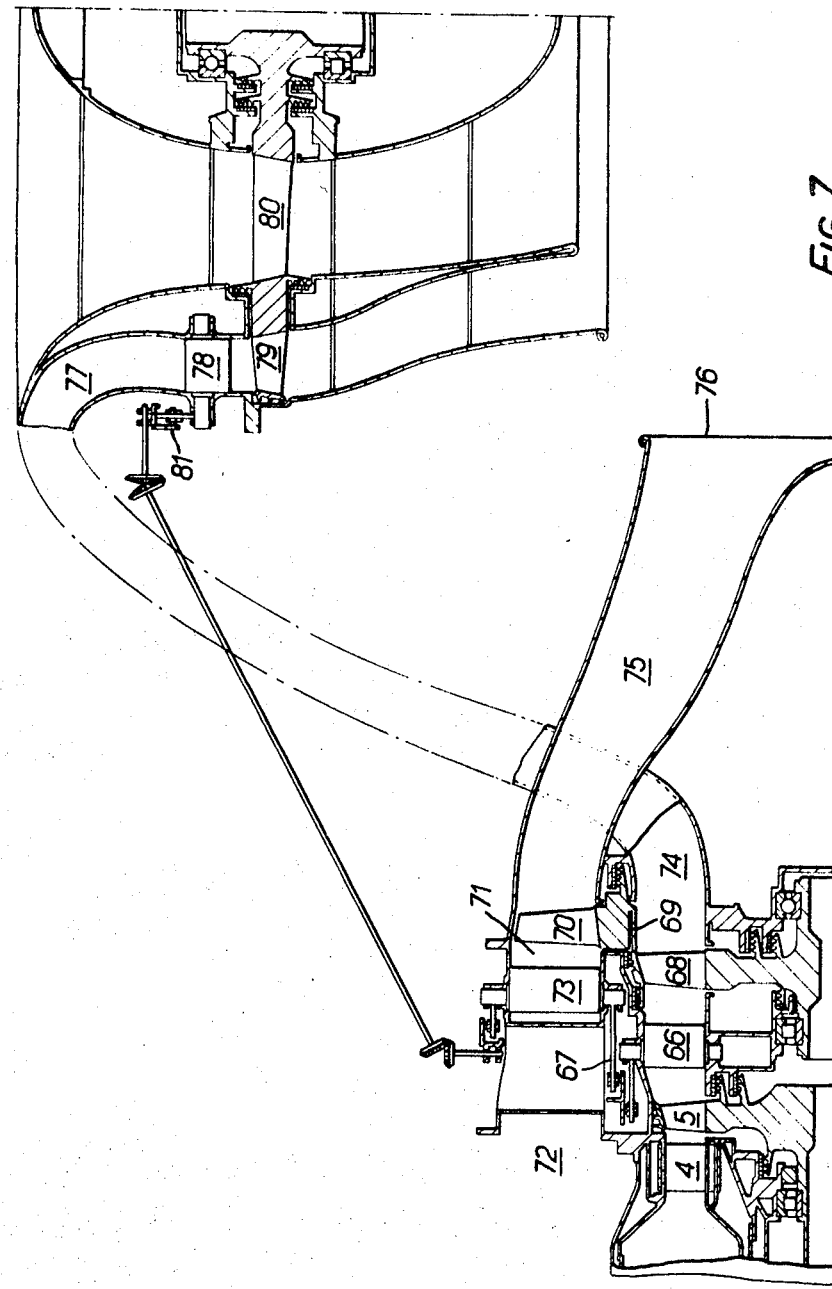
Figure 8:
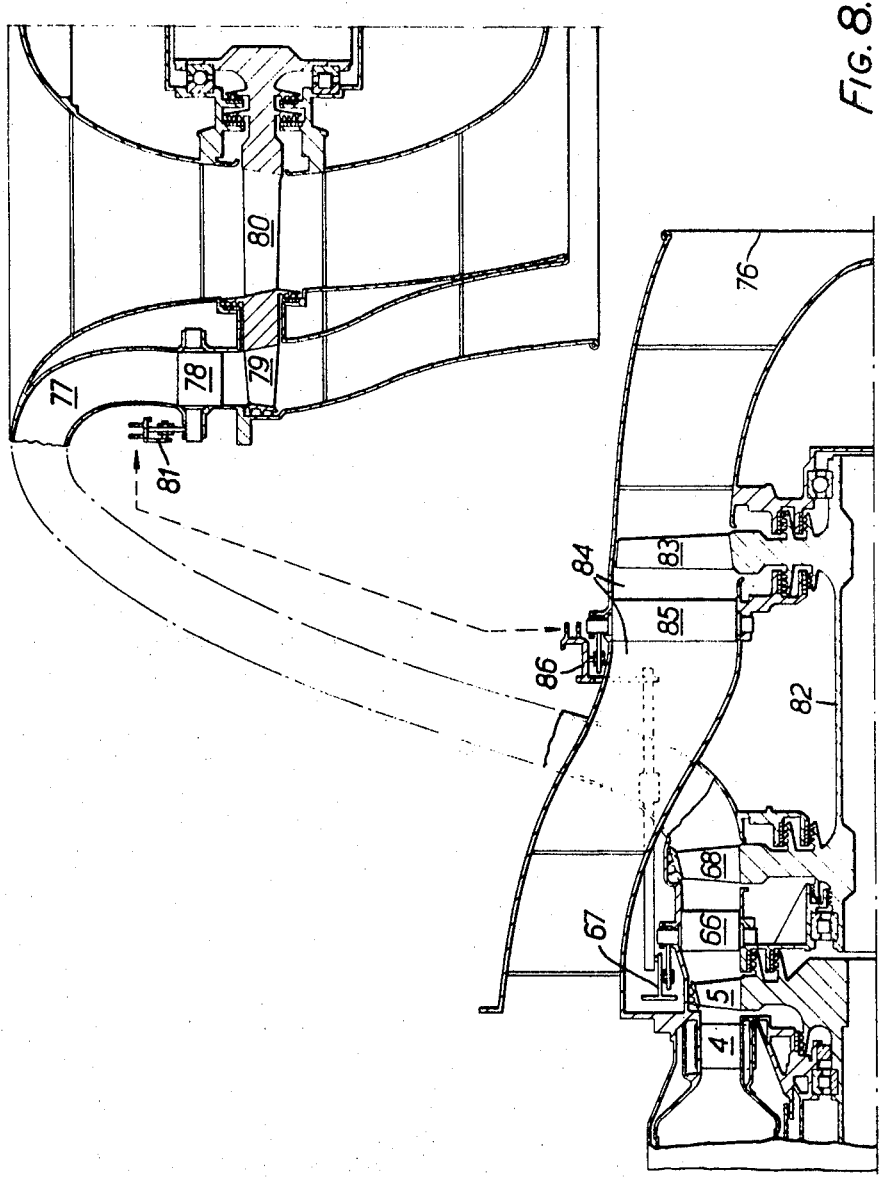

Various constructions of gas turbine power plant according to the invention as applied to aircraft are shown diagrammatically by way of example in the accompanying drawings, in which, FIGURE 1 is a diagrammatic side elevation partly in section of one form of gas turbine power plant according to the invention as applied to a helicopter aircraft, FIGURE 2 is a diagrammatic section side elevation, similar to the sectional part of FIGURE 1, of an alternative form of gas turbine power plant according to the invention also as applied to a helicopter aircraft, FIGURE 3 is a view on the line 3—3 of FIGURE 2 showing part of the adjusting mechanism, FIGURE 4 is a view on the line 4—4 of FIGURE 2, showing a further part of the adjusting mechanism, FIGURE 5 is a similar view to FIGURE 2 of a further construction of gas turbine power plant according to the invention as applied to a helicopter aircraft, FIGURE 6 is a similar view to FIGURE 2 of another form of gas turbine power plant according to the invention as applied to a helicopter aircraft, FIGURE 7 is a similar view to FIGURE 2 of a form of gas turbine power plant according to the invention as applied to an aircraft incorporating a lift fan, and FIGURE 8 is a similar view to FIGURE 2 of a still further construction of gas turbine power plant according to the invention as applied to an aircraft incorporating a lift fan.

In the construction diagrammatically shown in FIGURE 1 the power plant comprises a rotary compressor indicated generally at 1 having an air intake indicated at 2 and arranged to deliver air to combustion apparatus indicated at 3 the hot gases from which are passed through a nozzle ring 4 and act on a first turbine rotor 5 which drives the rotor of the compressor 1 in well known manner. Disposed in the rear of the turbine rotor 5 is a second nozzle ring 6 which is adjustable by adjusting mechanism indicated at 7 in a manner more fully described hereinafter. The adjustable nozzle ring 6 directs the hot gases on to a second turbine rotor 8, constituting a power turbine rotor, from which they pass through a third nozzle ring 9 which directs them onto a third turbine rotor 10 constituting another power turbine rotor. The nozzle ring 9 is adjustable by mechanism hereinafter described interconnected with the adjusting mechanism 7 for the adjustable nozzle ring 6.

As indicated the shaft 11 of the second turbine rotor 8 is connected by bevel gearing, indicated at 12, to transmission mechanism, diagrammatically indicated as a shaft 13, arranged to transmit rotation to a helicopter rotor 14. In the drawing the shaft 13 is for simplicity, shown diagrammatically as directly connecting the bevel gearing 12 to the helicopter rotor 14 but it will be understood that in practice suitable reduction gearing would be interposed between the bevel gearing and the shaft 13.

Supported from the tips of the blades of the third turbine rotor 10 is a ring 15 supporting the blades of a fan 16 extending across an air duct 17 and arranged to deliver air from the air inlet 18 at the forward end of the duct 17 to a "cold" propulsion nozzle 19 while the hot gases, after acting on the turbine rotor 10 pass to a "hot" propulsion nozzle 20 lying within the nozzle 19.

The shaft 13 is shown as passing through a tubular housing 21 extending across the passages by which respectively the air from the duct 17, and the hot gases pass to the propulsion nozzles 19 and 20, the tubular housing 21 being enclosed within streamlined fairings as indicated at 22 and 23.

Disposed in advance of the fan 16 is a ring of adjustable inlet guide vanes 24 arranged to be controlled by adjusting mechanism 25 and the adjusting mechanism 25 is also arranged to control through an interconnection indicated at 26 the adjustable nozzle ring 9 and hence, through the adjusting mechanism 7, the adjustable nozzle ring 6 so that the adjustable nozzle rings 6 and 9 and the adjustable inlet guide vanes 24 are all adjusted simultaneously in some predetermined relationship to suit variations in the demands for power respectively from the power turbine rotor 8 by the helicopter rotor 14 and from the turbine rotor 10 by the requirements of the nozzle 19 for propulsion air as determined by the pilot of the aircraft.

In a typical case the fuel supply to the combustion apparatus 3 would be controlled automatically in such a manner as to maintain the helicopter rotor 14 at substantially constant speed irrespective of changes in collective pitch effected by the pilot while the adjustment of the nozzle rings 6 and 9 and of the inlet guide vanes 24 would be effected in accordance with the demand for propulsive thrust from the nozzles 19 and 20.

In the power plant shown diagrammatically in FIGURE 2 the construction and arrangement of the compressor the combustion apparatus and the turbine rotor driving the compressor are the same as in FIGURE 1 and these parts have therefore been allotted the same reference numerals and will not again be described.

In the construction shown in FIGURE 2, as compared with the construction shown in FIGURE 1, the transmission mechanism by which a helicopter rotor 27 is driven is disposed between the first turbine rotor 5 and a second turbine rotor 28 by which the helicopter rotor 27 is driven, while in the rear of the turbine rotor 28 is a third rotor 29 the tips of the blades of which support a ring 30 carrying a ring of fan blades 31 disposed in an air duct 32 corresponding to the duct 17 in FIGURE 1. Thus in the construction therefore the shaft 34 passes through the 28 drives the helicopter rotor 27 through bevel gearing 33, reduction gearing (not shown) and a shaft 34 all in advance of the turbine rotor 28, while the turbine rotor 29 drives a fan 31 in the rear of the helicopter rotor. In this construction therefore the shaft 34 passes through tubular housings 35 and 36 which extend respectively across the air duct 32, and the hot gas duct extending between the turbine rotors 5 and 28 and are surrounded by streamlined fairings 35A and 36A.

In this construction the turbine rotor 28 has associated with it an adjustable nozzle ring 37, the turbine rotor 29 has associated with it an adjustable nozzle ring 38 and the fan 31 has associated with it adjustable inlet guide vanes 39, the operation of the adjustable inlet guide vanes 39, the adjustable nozzle ring 38 and the adjustable nozzle ring 37 being effected simultaneously by adjusting mechanism shown more clearly in FIGURES 3 and 4. The hot gases after acting on the various turbine rotors in this construction are ejected through a hot nozzle 42 corresponding to the nozzle 20 in FIGURE 1.

The nozzle ring 37 comprises a series of blades pivotally supported at their inner and outer ends, the latter being indicated 101 in FIGURE 3, and to which are connected the inner ends of axially extending arms 102 the outer ends of which are connected to plates 102A to which are connected the inner ends of radially extending arms 103, the outer ends of which are connected to an axially extending ring 104.

The pivotally mounted outer ends 105 of the blades forming the nozzle ring 38 are also connected to axially extending arms 106 the ends of which are similarly connected to the inner ends of radially extending arms 107 the outer ends of which are pivotally connected to the ring 104. Thus movement of the ring 104 will simultaneously move the blades of the nozzle rings 37 and 38.

Connected to the outside of the ring 104 are the inner ends of radially extending arms 108 to the outer ends of which are connected the inner ends of axially extending arms 109, the outer ends of which are connected to the inner pivotally mounted ends 110 of the guide vanes 39.

As shown more clearly in FIGURE 4 the outer pivotally mounted ends 111 of the guide vanes 39 are connected to the ends of axially extending arms 112 the other ends of which are connected to radially disposed arms 113 connected to a ring 114. The ring 114 has connected to it a rod 115 by means of which it can be controlled.

Although only one form of adjusting mechanism has been described in detail it will be appreciated that similar adjusting mechanism can be used in the construction shown in FIGURE 1 and the arrangement may be modified appropriately to provide suitable adjusting mechanism for use in the other constructions described hereafter.

In the power plant shown diagrammatically in FIGURE 5 the general construction and arrangement of the compressor 1, combustion apparatus 3, nozzle ring 4, turbine rotor 5, turbine rotor 28, helicopter rotor 27 and the mechanism by which the turbine rotor 28 drives the helicopter rotor 27 are substantially the same as in FIGURE 2 and corresponding parts have therefore been identified by corresponding reference numerals and will not again be described.

In the construction shown in FIGURE 5, instead of an adjustable nozzle ring 38 and turbine rotor 29 driving a fan 31 being disposed immediately in the rear of the turbine 28 as in FIGURE 2, the hot gases after leaving the turbine rotor 28 flow through a series of outwardly inclined hot gas ducts of which one is shown at 43 interposed between a series of inwardly inclined air ducts one of which is shown at 44, leading from a forwardly facing air intake 45, corresponding to the air intake 36B in FIGURE 2, to a cold nozzle 46 corresponding to the nozzle 37B in FIGURE 2 but situated inside an annular hot nozzle 47 for the hot gases. Moreover in this construction the hot gases pass from the ducts 43 through an adjustable nozzle ring 48 and act on the blades 49 of a turbine rotor supported from the tips of a ring of fan blades 50 extending across an annular air duct 51 into which the passages 44 open and which terminates in the nozzle 46.

In this construction, as in FIGURE 2, the shaft 34 passes through tubular housings 35 and 36 which extend across the air duct and hot gas duct and are surrounded by streamlined fairings 35a and 36a.

In the construction shown in FIGURE 5 the hot gases are directed onto the turbine rotor 28 by an adjustable nozzle ring 52 having adjusting mechanism 53 while the fan 50 is provided with adjustable inlet guide vanes 54 having associated adjusting mechanism shown generally at 55 by which simultaneous adjustment of the guide vanes 54 and of the adjustable nozzle ring 48 is effected. The adjusting mechanisms 53 and 55 are arranged to be simultaneously operated in some predetermined relationship by common control mechanism (not shown).

The construction shown in FIGURE 6 is generally similar to that shown in FIGURE 2 except for the arrangement of the gas and air ducting in the rear of the turbine rotor 29 and the construction and arrangement of the fan driven by the turbine rotor 29 and other associated details. Similar parts have therefore been given the same reference numerals in FIGURE 6 as in FIGURE 2 and will not again be described while the following is a description of the modifications as compared with FIGURE 2.

In FIGURE 6 the turbine rotor 29 is mounted upon one end of the shaft 56 the other end of which carries a fan 57 extending across an annular air duct 58 terminating in a cold propulsion nozzle 59 and connected at its forward end by a series of spaced air ducts 60 to a forwardly facing air intake 61 corresponding to the air intake 36B in FIGURE 2 while, interposed between the ducts 60 are hot gas ducts 62 arranged to lead the hot gases from the turbine rotor 29 to a hot propulsion nozzle 63. Adjustable inlet guide vanes 64 are provided in advance of the fan 57 and are arranged to be actuated by adjusting mechanism 65 which will be arranged to be operated by control mechanism (not shown) simultaneously with the adjusting mechanism 41 for the two adjustable nozzle rings 37 and 38.

In the construction shown in FIGURE 7 the compressor 1, combustion apparatus 3, nozzle ring 4 and a turbine rotor 5 are constructed and arranged in the same manner as the corresponding parts in FIGURE 1 and have therefore been given the same reference numerals and will not again be described.

In the construction shown in FIGURE 7 the hot gases, after leaving the turbine rotor 5, pass through an adjustable nozzle ring 66 having adjusting mechanism 67 and then act on a turbine rotor 68 the tips of the blades of which carry a ring 69 supporting the blades of a fan 70 extending across an annular air duct 71 having a forwardly facing air intake 72. Adjustable inlet guide vanes 73 are provided immediately in advance of the fan 70 and these adjustable inlet guide vanes and the adjusting mechanisms for the inlet guide vanes 73 and the adjustable nozzle ring 66 are interconnected so as to be operated simultaneously.

After leaving the turbine rotor 68 the hot gases pass through outwardly inclined hot gas passages 74 interposed between inwardly inclined air passages 75 extending from the annular duct 71 to a cold propulsion nozzle 76. The hot gas ducts 74 lead into an annular plenum chamber 77 from which they pass through an adjustable nozzle ring 78 to act upon the turbine blades 79 of a lift fan 80 from the blades of which the turbine blades 79 are supported. The adjusting mechanism 81 of the adjustable nozzle ring 78 is arranged to be operated simultaneously with the adjusting mechanism for the inlet guide vanes 73 and the adjustable nozzle ring 66 in predetermined manner.

In the construction shown in FIGURE 8 the arrangement is generally similar to that shown in FIGURE 7 and corresponding parts have been given the same reference numerals as in FIGURE 7 and will not again be described.

In FIGURE 8, instead of the turbine rotor 68 supporting the blades of a fan 70 as in FIGURE 7 it is mounted upon one end of a shaft 82 which carries at its other end a separate fan, the blades 83 of which extend across an annular duct 84 immediately in advance of the nozzle 76 while adjustable inlet guide vanes 85, corresponding to the inlet guide vanes 73 in FIGURE 7, are provided in advance of the fan 83. In this construction the adjusting mechanism 86 for the inlet guide vanes 85, the adjusting mechanism 81 for the adjustable nozzle ring 78 and the adjusting mechanism 67 for the adjustable nozzle ring 66 will be arranged to be simultaneously operated by common control apparatus (not shown).

What we claim as our invention and desire to secure by Letters Patent is:

1. A gas turbine power plant comprising an air compressor, combustion apparatus arranged to receive such air, a first turbine rotor drivingly connected to the air compressor, a nozzle ring disposed in advance of the first turbine rotor, means for leading the hot gases from the combustion apparatus to act on the first turbine rotor, second and third nozzle rings disposed in advance respectively of second and third turbine rotors arranged in flow series and constituting independent sources of mechanical power, the second and third nozzle rings being adjustable and having associated with them adjusting mechanism arranged to control them simultaneously in a predetermined relationship for varying the mechanical power output available respectively from the second and third turbine rotors.

2. A gas turbine power plant as claimed in claim 1 for a helicopter aircraft including a fan providing propulsion air for jet propulsion purposes and arranged to be driven by one of said power turbine rotors, the other power turbine rotor being arranged to drive at least one helicopter rotor.

3. A gas turbine power plant as claimed in claim 2 in which the second power turbine rotor is arranged to drive the helicopter rotor.

4. A gas turbine power plant as claimed in claim 2 in which the fan is provided with adjustable inlet guide vanes and further adjusting mechanism is provided for said guide vanes arranged to be operated simultaneously with said adjusting mechanism for the adjustable nozzle rings associated with said second and third turbine rotors.

5. A gas turbine power plant as claimed in claim 1 including a propulsion air fan for delivering propulsion air to at least one propulsion nozzle, and a lift fan, one of said power turbine rotors being arranged to drive the propulsion air fan, and the other said lift fan.

6. A gas turbine power plant as claimed in claim 5 in which said second power turbine rotor is arranged to drive said propulsion air fan.

7. A gas turbine power plant as claimed in claim 5 including adjustable inlet guide vanes associated with the propulsion air fan and adjusting mechanism for said guide vanes arranged to be actuated simultaneously with the adjusting mechanism for the adjustable nozzle ring associated with the second and third power turbine rotors.

References Cited

UNITED STATES PATENTS

| | | | |
|---|---|---|---|
| 3,146,590 | 9/1964 | Erwin | 60—39.25 |
| 3,186,165 | 6/1965 | Edkins | 60—39.16 |
| 3,368,778 | 2/1968 | Wilde | 244—7 |
| 3,373,561 | 3/1968 | Jubb | 60—39.25 |

FOREIGN PATENTS 857,037  12/1960  Great Britain.

CARLTON R. CROYLE, Primary Examiner

D. HART, Assistant Examiner

U.S. Cl. X.R.

60—226, 39.16; 244—7, 12